(12) United States Patent
Wang et al.

(10) Patent No.: US 12,084,470 B2
(45) Date of Patent: Sep. 10, 2024

(54) METHOD FOR PREPARING BISPHENOL PHOSPHATE HYDROXYL ALUMINUM SALT NUCLEATING AGENT

(71) Applicant: SHANXI INSTITUTE OF CHEMICAL INDUSTRY (LTD.), Shanxi (CN)

(72) Inventors: Kezhi Wang, Shanxi (CN); Jianjun Zhang, Shanxi (CN); Chenxi Mao, Shanxi (CN); Xiangyang Li, Shanxi (CN); Fuhua Lin, Shanxi (CN); Xungang Li, Shanxi (CN); Jing Wang, Shanxi (CN); Ran Wang, Shanxi (CN); Fengyu Liu, Shanxi (CN); Chen Wang, Shanxi (CN); Kai Wang, Shanxi (CN); Shaoyang Li, Shanxi (CN); Hongyu Zhang, Shanxi (CN); Yanwen Zhong, Shanxi (CN); Huifang Zhang, Shanxi (CN); Yanqin Dai, Shanxi (CN); Kai Cui, Shanxi (CN); Mi Zhang, Shanxi (CN); Yilong Gong, Shanxi (CN); Chaoyang Lu, Shanxi (CN)

(73) Assignee: SHANXI INSTITUTE OF CHEMICAL INDUSTRY (LTD.), Shanxi (CN)

( * ) Notice: Subject to any disclaimer, the term of this patent is extended or adjusted under 35 U.S.C. 154(b) by 993 days.

(21) Appl. No.: 17/049,955

(22) PCT Filed: Apr. 30, 2020

(86) PCT No.: PCT/CN2020/087929
§ 371 (c)(1),
(2) Date: Oct. 23, 2020

(87) PCT Pub. No.: WO2021/073070
PCT Pub. Date: Apr. 22, 2021

(65) Prior Publication Data
US 2023/0127159 A1    Apr. 27, 2023

(30) Foreign Application Priority Data

Oct. 16, 2019 (CN) .......................... 201910983521.6

(51) Int. Cl.
C07F 9/6574 (2006.01)
(52) U.S. Cl.
CPC .............................. *C07F 9/65744* (2013.01)
(58) Field of Classification Search
CPC ...................................................... C07F 5/069
See application file for complete search history.

(56) References Cited

U.S. PATENT DOCUMENTS

| 5,342,868 | A  | * | 8/1994 | Kimura | ................. | C08K 5/527 |
|---|---|---|---|---|---|---|
| | | | | | | 524/609 |
| 2018/0127555 | A1 | * | 5/2018 | Chaudhary | .............. | C08J 3/201 |
| 2019/0284217 | A1 | * | 9/2019 | Mizushima | ............ | C08K 5/098 |
| 2020/0207950 | A1 | * | 7/2020 | Fukuda | ..................... | C08K 5/17 |

FOREIGN PATENT DOCUMENTS

CN          102850578 A    *    1/2013

* cited by examiner

*Primary Examiner* — Alexander R Pagano

(57) ABSTRACT

A method for preparing a bisphenol phosphate hydroxyl aluminum salt nucleating agent is provided, which adopts organic aluminum alcoholate as raw materials to prepare bisphenol phosphate hydroxyl aluminum salt. In prior art, a neutralization reaction of bisphenol phosphate and sodium hydroxide is firstly performed, so as to prepare bisphenol phosphate sodium salt; then a double decomposition reaction of sodium salt and inorganic aluminum salt is performed to prepare the bisphenol phosphate hydroxyl aluminum salt. The present invention combines the two-step reaction in prior art into the one-step reaction of phosphate and organic aluminum alcoholate for synthesizing the bisphenol phosphate hydroxyl aluminum salt, thereby simplifying the production process, improving the production efficiency, shortening the reaction time, and improving the product quality. Moreover, during the production process of the preparation method provided by the present invention, no brine waste is generated, so that the production process is environment-friendly.

5 Claims, 1 Drawing Sheet

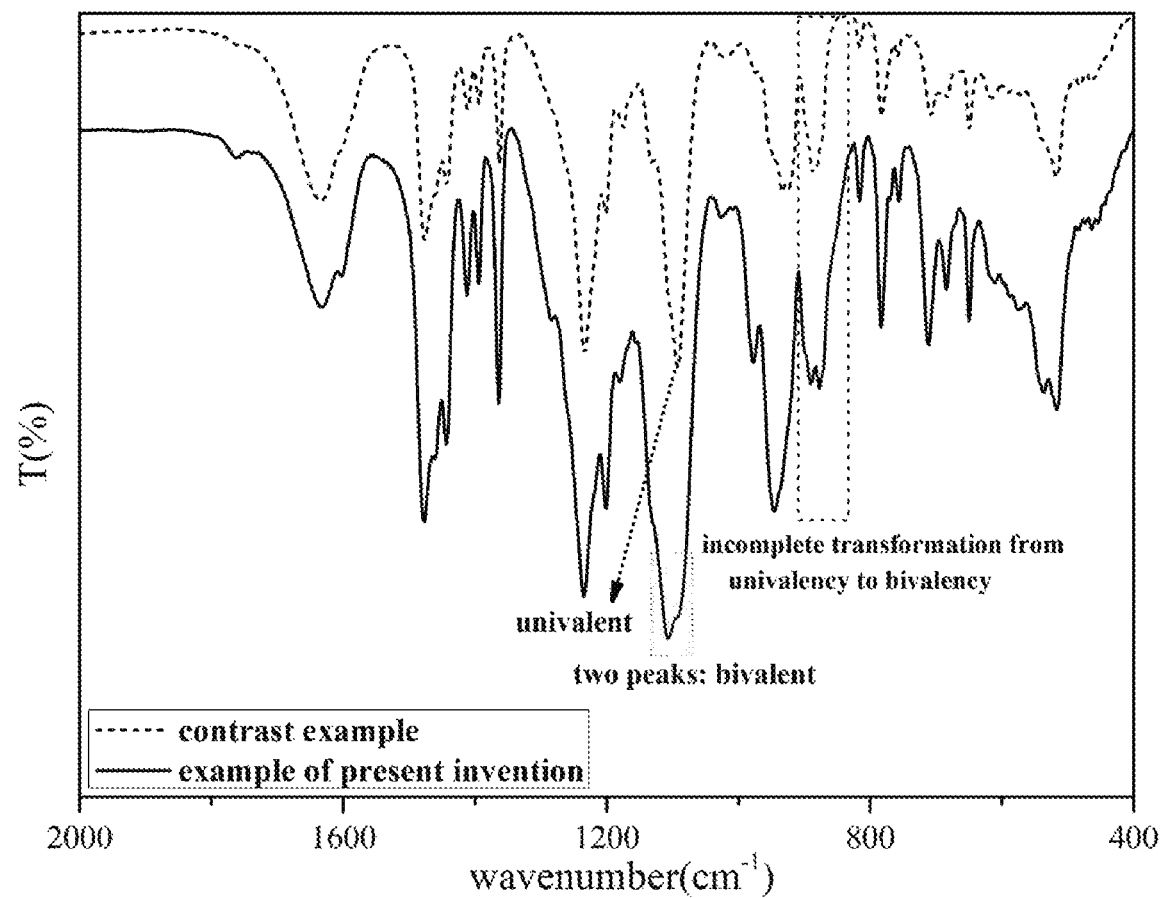

METHOD FOR PREPARING BISPHENOL PHOSPHATE HYDROXYL ALUMINUM SALT NUCLEATING AGENT

FIELD OF INVENTION

The present invention relates to a technical field of polymer nucleating agent, and more particularly to a method for preparing a bisphenol phosphate hydroxyl aluminum salt nucleating agent.

DESCRIPTION OF RELATED ARTS

Compared with the conventional α-crystal form nucleating agent, the polypropylene α-crystal form nucleating agent of aryl phosphate salts is able to give the good rigidity, transparency, surface glossiness and thermal deformation resistance to the polypropylene resin under the relatively low concentration. The aryl phosphate salt has the good compatibility with the matrix resin, is easily dispersed and has the good extraction resistance, so that the aryl phosphate salt is widely applied in the modified products such as the high-rigidity PP special materials, transparent injection molding products, automobile PP parts, and disposable syringes. In addition, the aryl phosphate salt also has the good nucleating effect on the engineering plastics such as PET, PBT and PA. The Chinese patent applications of CN201610873241.6, CN201110151387.7 and CN20111051413.6 disclose the synthetic process of aryl phosphate salt.

In the above conventional methods for preparing the bisphenol phosphate hydroxyl aluminum salt, the bisphenol phosphate is firstly neutralized with the alkali to prepare the bisphenol phosphate sodium salt; then a double decomposition reaction of sodium salt and inorganic aluminum salt is performed to prepare the bisphenol phosphate hydroxyl aluminum salt. The two reactions are both heterogeneous reactions, with the slow reaction speed and long reaction time; moreover, the product purity is low, a great amount of mono-substituted by-products of aluminum exist, and the brine waste will be generated.

The synthetic principle of the bisphenol phosphate hydroxyl aluminum salt nucleating agent with the above conventional methods is:

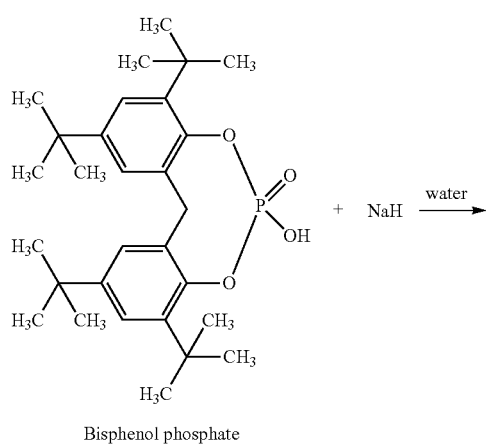

Bisphenol phosphate

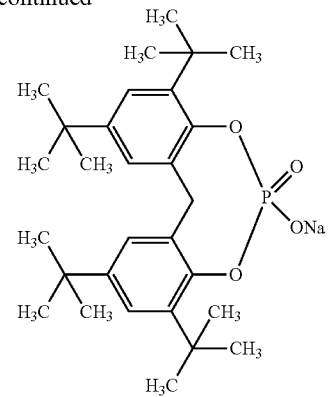

Bisphenol phosphate sodium salt

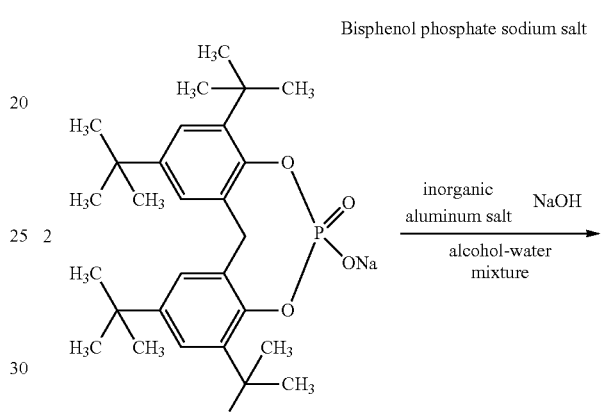

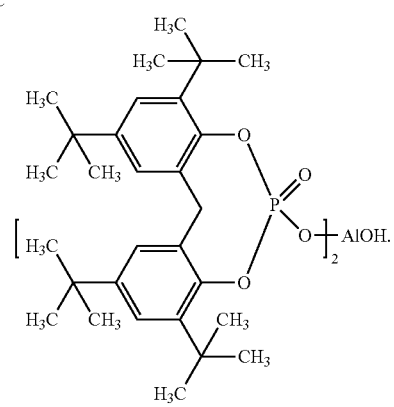

Product

SUMMARY OF THE PRESENT INVENTION

In order to overcome deficiencies in prior art, the present invention provides a method for preparing a bisphenol phosphate hydroxyl aluminum salt nucleating agent, which uses bisphenol phosphate and aluminum alcoholate to prepare alcohol-substituted bisphenol phosphate hydroxyl aluminum salt, then hydrolyzes, and prepares the bisphenol phosphate hydroxyl aluminum salt with a one-pot method.

A method for preparing a bisphenol phosphate hydroxyl aluminum salt nucleating agent comprises steps of:
(1) adding bisphenol phosphate and alkyl aluminum alcoholate into an organic solvent; reacting at a certain temperature; and obtaining an intermediate; and
(2) adding water into the intermediate obtained through the step (1), then hydrolyzing, and distilling, so as to remove by-product alcohols and the organic solvent; filtering, drying, and finally obtaining the bisphenol phosphate hydroxyl aluminum salt nucleating agent.

Preferably, in the step (1), an addition amount of the alkyl aluminum alcoholate is 0.95-1.05 times a theoretical amount; an amount of the organic solvent is 1.5-6 times a weight of the bisphenol phosphate, further preferably 2-4 times.

Preferably, the certain temperature in the step (1) is 25° C.-140° C.; further preferably, the certain temperature is 70° C.-110° C.

The bisphenol phosphate hydroxyl aluminum salt nucleating agent is bis [2,2'-methylene-bis(4,6-di-tert-butylphenyl)phosphate] hydroxyl aluminum salt, wherein a structural formula thereof is:

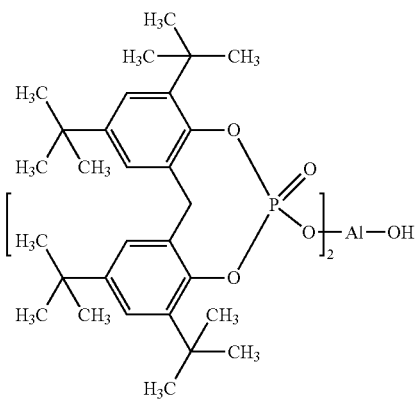

The bisphenol phosphate is 2,2'-methylene-bis(4,6-di-tert-butylphenyl)phosphate, wherein a structural formula thereof is:

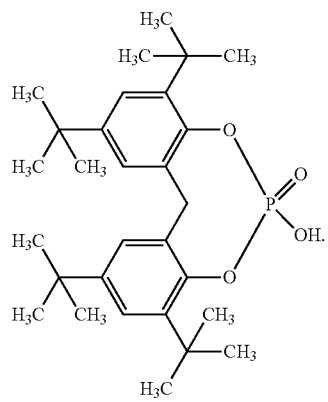 [SMILES: CC(C)(C)c1cc2c(c(C(C)(C)C)c1)OP(=O)(O)Oc1c(cc(C(C)(C)C)cc1C(C)(C)C)C2]

The aluminum alcoholate $(Al(OR)_3)$ is low-carbon aluminum alcoholate containing 1-4 carbon atoms.

The intermediate is bis [2,2'-methylene-bis(4,6-di-tert-butylphenyl)phosphate] alcohol group aluminum salt, wherein a structural formula thereof is:

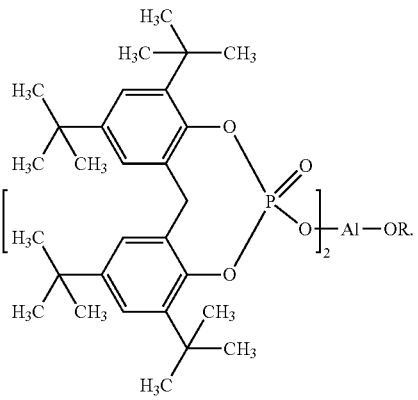

An alcohol group in the alcohol group aluminum salt is low-carbon alcohol containing 1-4 carbon atoms, corresponding to the aluminum alcoholate $(Al(OR)_3)$.

The organic solvent is alkane, cycloalkane, benzene, methylbenzene, dimethylbenzene, or chloroalkane such as dichloromethane and chloroform.

The synthetic principle of the present invention is:

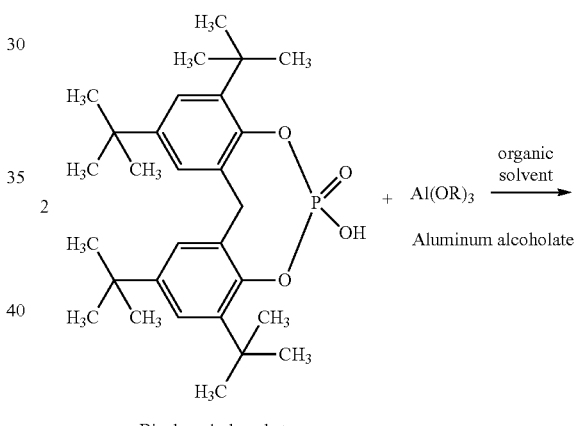

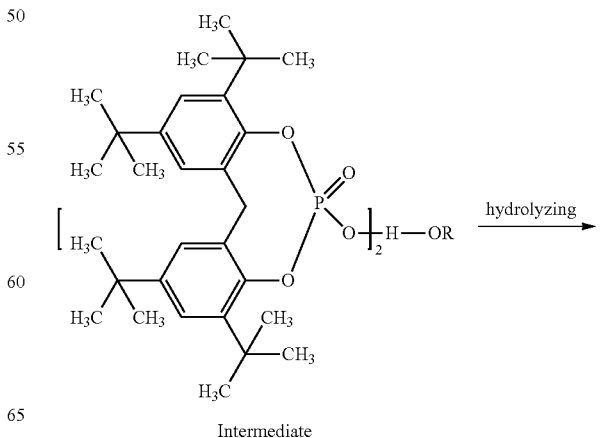

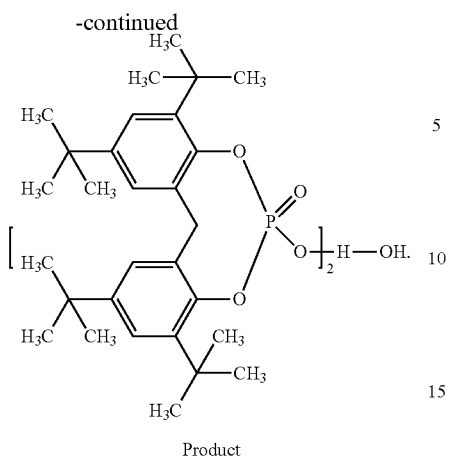

Product

The beneficial effects of the present invention are described as follows.

The present invention adopts the organic aluminum alcoholate as the raw material to prepare the bisphenol phosphate hydroxyl aluminum salt, which combines the two-step reaction in prior art into the one-step reaction of phosphate and organic aluminum alcoholate for synthesizing the bisphenol phosphate hydroxyl aluminum salt, thereby simplifying the production process, improving the production efficiency, shortening the reaction time, and improving the product quality. Moreover, during the production process of the preparation method provided by the present invention, no brine waste is generated, so that the production process is environment-friendly.

BRIEF DESCRIPTION OF THE DRAWINGS

The figure shows FT-IR spectrums of bisphenol phosphate hydroxyl aluminum salt nucleating agent.

DETAILED DESCRIPTION OF THE PREFERRED EMBODIMENT

CONTRAST EXAMPLE

Adding 3.34 g sodium hydroxide and 100 ml water into a reaction flask; stirring, and adding 36 g bisphenol phosphate; heating to 80° C., and keeping reaction for 2 hours; performing suction filtration, drying, and obtaining the bisphenol phosphate sodium salt; adding the bisphenol phosphate sodium salt into 170 ml mixed solution of ethyl alcohol and water; rising a temperature to about 60° C.; after the bisphenol phosphate sodium salt is completely dissolved, dripping a mixed solution of 8.4 g aluminum trichloride and 10 ml water into a reaction kettle, and reacting for two hours; adding 1.56 g caustic soda flakes into the reaction kettle, and reacting for half hour; performing suction filtration, drying, and obtaining bisphenol phosphate hydroxyl aluminum salt.

Example of Present Invention

Adding 12 g bisphenol phosphate, 2.65 g aluminum isopropoxide and 60 nil methylbenzene into a reaction flask; stirring, slowly heating, and distilling by-products; after reacting completely, adding water, distilling, and recycling the methylbenzene; after distillation is completed, cooling, performing suction filtration, drying, and obtaining the product of bisphenol phosphate hydroxyl aluminum salt.

Product Testing

1. Element Analysis

| Product | Phosphorus content (%) | Aluminum content (%) |
|---|---|---|
| Contrast example | 5.91 | 2.41 |
| Example of present invention | 6.23 | 2.68 |
| Theoretical value | 6.17 | 2.69 |

The element analysis conclusion is described as follows. The contrast example prepares the product with the conventional method; in comparison, the example prepares the product with the method provided by the present invention, and the element analysis result thereof is closer to the theoretical value.

2. Infrared Analysis

The figure shows FT-IR spectrums of bisphenol phosphate hydroxyl aluminum salt nucleating agent. The infrared peak positions of 1100 cm$^{-1}$ and 880 cm$^{-1}$ are the characteristic peaks of P-O-M (M for metal). When the valence state of M changed from univalent to multivalent substitution, the peak type will be divided into two. The peak type of the contrast example is single peak at 1100 cm$^{-1}$, and the double peak at 880 cm$^{-1}$ is not obvious, while the example of the present invention is double peak. Therefore, it can be judged that the response degree of the contrast example is lower.

What is claimed is:

1. A method for preparing a bisphenol phosphate hydroxyl aluminum salt nucleating agent, comprising steps of:
   (1) adding bisphenol phosphate and alkyl aluminum alcoholate into an organic solvent; reacting at a certain temperature, and obtaining an intermediate; and
   (2) adding water into the intermediate obtained through the step (1), then hydrolyzing, and distilling, so as to remove by-product alcohols and the organic solvent; filtering, drying, and finally obtaining the bisphenol phosphate hydroxyl aluminum salt nucleating agent.

2. The method, as recited in claim 1, wherein: in the step (1), an addition amount of the alkyl aluminum alcoholate is 0.95-1.05 times a theoretical amount; an amount of the organic solvent is 1.5-6 times a weight of the bisphenol phosphate.

3. The method, as recited in claim 1, wherein: the organic solvent is alkane, cycloalkane, benzene, methylbenzene, dimethylbenzene, or chloroalkane.

4. The method, as recited in claim 1, wherein the certain temperature in the step (1) is 25° C.-140° C.

5. The method, as recited in claim 4, wherein the certain temperature is 70° C.-110° C.

* * * * *